US008653170B2

(12) United States Patent
Nadella et al.

(10) Patent No.: US 8,653,170 B2
(45) Date of Patent: Feb. 18, 2014

(54) DYNAMIC VULCANIZATION PROCESS FOR PREPARING THERMOPLASTIC ELASTOMERS

(75) Inventors: Hari Prasad Nadella, Copley, OH (US); Ronald DeYoung, Westfield Center, OH (US); Jianya Cheng, Fairlawn, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 816 days.

(21) Appl. No.: 11/375,737

(22) Filed: Mar. 15, 2006

(65) Prior Publication Data

US 2006/0293454 A1 Dec. 28, 2006

Related U.S. Application Data

(63) Continuation-in-part of application No. 11/167,339, filed on Jun. 27, 2005.

(51) Int. Cl.
*C08F 8/00* (2006.01)

(52) U.S. Cl.
USPC ........... 524/279; 525/191; 525/232; 525/240; 525/331.7; 525/331.8

(58) Field of Classification Search
USPC ........ 525/191, 232, 240, 331.7, 331.8, 301.5; 524/270
See application file for complete search history.

(56) References Cited

U.S. PATENT DOCUMENTS

| | | | |
|---|---|---|---|
| 2,631,727 A | 3/1953 | Cichelli | |
| 2,765,282 A | 10/1956 | Elliott | |
| 2,859,170 A | 11/1958 | Dickens et al. | |
| 4,130,535 A | 12/1978 | Coran et al. | |
| 4,176,967 A | 12/1979 | Brinkmann et al. | |
| 4,311,628 A | 1/1982 | Abdou-Sabet et al. | |
| 4,594,390 A | 6/1986 | Abdou-Sabet et al. | |
| 4,594,391 A | 6/1986 | Jones | |
| 4,940,830 A | 7/1990 | Zinnen et al. | |
| 5,108,711 A | 4/1992 | Chszaniecki | |
| 5,158,725 A | 10/1992 | Handa et al. | |
| 5,349,005 A | 9/1994 | Tanaka | |
| 6,042,260 A | 3/2000 | Heidemeyer et al. | |
| 6,147,160 A | 11/2000 | Wang et al. | |
| 6,150,464 A | 11/2000 | Medsker et al. | |
| 6,210,030 B1 | 4/2001 | Ibar | |
| 6,299,340 B1 | 10/2001 | Lu et al. | |
| 6,437,030 B1 | 8/2002 | Coran et al. | |
| 6,451,915 B1 | 9/2002 | Ellul et al. | |
| 6,610,786 B1 | 8/2003 | Itoh et al. | |
| 6,646,056 B2 * | 11/2003 | Zhao et al. | 525/243 |
| 6,890,990 B2 * | 5/2005 | Cai et al. | 525/191 |
| 7,025,491 B2 | 4/2006 | Blach et al. | |
| 7,040,798 B2 | 5/2006 | Innerebner et al. | |
| 7,407,611 B2 | 8/2008 | Innerebner et al. | |
| 7,452,940 B2 | 11/2008 | Dozeman et al. | |
| 7,572,858 B2 | 8/2009 | Wang | |
| 7,622,528 B2 | 11/2009 | Chung et al. | |
| 2004/0094862 A1 | 5/2004 | Sturm et al. | |
| 2005/0043484 A1 | 2/2005 | Wang et al. | |
| 2005/0089595 A1 | 4/2005 | Blach | |
| 2005/0140049 A1 | 6/2005 | James et al. | |
| 2007/0043172 A1 | 2/2007 | Ellul et al. | |

FOREIGN PATENT DOCUMENTS

| | | |
|---|---|---|
| DE | 3541414 | 11/1985 |
| EP | 0 072 203 | 2/1983 |
| EP | 0 109 375 | 5/1984 |
| EP | 0 320 001 | 6/1989 |
| EP | 0 436 724 | 7/1991 |
| EP | 0 547 843 | 6/1993 |
| EP | 0 574 040 | 12/1993 |
| EP | 0 757 077 | 2/1997 |
| EP | 0 892 831 | 1/1999 |
| JP | 04-258639 | 9/1992 |
| JP | 2002-201313 | 7/2002 |
| WO | WO 03/031150 | 4/2003 |
| WO | WO 2004/009327 A1 | 1/2004 |
| WO | WO2005010094 | 2/2005 |
| WO | WO 2005/028555 | 3/2005 |

OTHER PUBLICATIONS

T. Abraham, C. McMahan in *Thermoplastic Elastomers: Fundamentals and Applications*, Rubber Compounding: Chemistry and Applications 163, 206-209 (Marcel Dekker, 2004).
A.Y. Coran, in *Vulcanization*, Science and Technology of Rubber, 291-92 (Academic Press, F.R. Eirich, ed., 1978).
Sun et al., "Effect of Short Chain Branching on the Coil Dimensions of Polyolefins in Dilute Solution," Macromolecules vol. 34, Issue 19 (2001), pp. 6812-6820.
Sabet et al., "Dynamically Vulcanized Thermoplastic Elastomers," 69(3) in Rubber Chemistry and Technology (Jul.-Aug. 1996).
N. G. Gaylord, "Compatibilizing Agents: Structure and Function in Polyblends," Journal of Macromolecular Science, Part A, vol. 26, Issue 8 (Aug. 1989), pp. 1211-1229.
F. Ide et al., "Studies on Polymer Blend of Nylon 6 and Polypropylene or Nylon 6 and Polystyrene Using the Reaction of Polymer," Journal of Applied Polymer Science, vol. 18, Issue 4 (Apr. 1974), pp. 963-974.
S. J. Park et al., "Morphological, thermal and rheological properties of the blends polypropylene/nylon-6, polypropylene/nylon-6/ (maleic anhydride-g-polypropylene) and (maleic anhydride-g-polypropylene)/nylon-6," European Polymer Journal, vol. 26, Issue 2, 1990, pp. 131-136.
"Processing Line," Published by Krupp Werner & Pfleiderer Corporation (Coperion Corporation), Ramsey, New Jersey, vol. 9, No. 1 (Jan. 1999), pp. 2-6.
Journal of Society of Rubber Industry, Japan, 81(2), p. 78 (2008), (English translation attached).

* cited by examiner

*Primary Examiner* — Irina S Zemel

(57) ABSTRACT

Described in one aspect is a process for preparing a low durometer thermoplastic vulcanizate composition comprising melt blending one or more thermoplastic polymer(s) with a cross-linkable elastomer under conditions of dynamic vulcanization; adding at or after the start of the melt blending at least one curative agent for the elastomer so as to cross-link the elastomer during the melt blending; introducing process oil into the melt blending before, during and/or after the addition of the curative agent; and, extruding a fully crosslinked thermoplastic vulcanizate having a Shore A Hardness of less than 25.

25 Claims, 2 Drawing Sheets

DYNAMIC VULCANIZATION PROCESS FOR PREPARING THERMOPLASTIC ELASTOMERS

CROSS-REFERENCE TO RELATED APPLICATION

This application is a continuation-in-part of, and claims priority to, U.S. Ser. No. 11/167,339, filed Jun. 27, 2005.

FIELD OF THE INVENTION

The present invention relates to a process for making thermoplastic elastomers by dynamic vulcanization in the presence of processing oil and the composition therefrom.

BACKGROUND OF THE INVENTION

Dynamically vulcanized thermoplastic elastomers (thermoplastic vulcanizates, or "TPVs"), as with traditional thermoplastic elastomers, have a combination of both thermoplastic and elastic properties. The thermoplastic vulcanizates are prepared by mixing and shearing a thermoplastic polymer, a vulcanizable elastomer and a curing agent. The vulcanizable elastomer is dynamically cured during the shearing and mixing and is intimately and uniformly dispersed as a particulate phase within a continuous phase of the thermoplastic polymer. See, for example U.S. Pat. Nos. 4,130,535, 4,311,628, 4,594,390 and 6,147,160. Typically, the thermoplastic forms a "continuous" phase in the TPV, which is desirable for later processing the TPV into articles of manufacture. What would be desirable is to find a balance of the elastomer and thermoplastic in TPVs such that a higher degree of elastomer relative to thermoplastic can be achieved in order to make soft articles.

The physical properties of TPVs, in particular, the "softness" or "hardness", measured quantitatively as Shore A (or D) Hardness, are controlled by many factors. One factor is the balance of elastomer versus thermoplastic that is present in the TPV. Increasing the relative amount of elastomer tends to make the TPV softer, while increasing the relative amount of thermoplastic makes the TPV harder. These physical characteristics are, however, in balance with the processability of the TPV, that is, how well it extrudes to form articles of manufacture. Lowering the level of thermoplastic below a certain threshold can often result in a loss of the continuous thermoplastic phase and agglomeration of the elastomeric phase, making any finished article having a "powdery" quality. Also, this lowered level of thermoplastic will diminish the processability of the TPV. This diminished processability can be compensated for by addition of oils to the elastomer/thermoplastic blends. However, the addition of excessive oils can lead to a disproportionate swelling of the elastomer phase of the TPV, thus reducing the thermoplastic phase volume.

The cure state of the TPV is another factor that may independently influence the softness or hardness of the TPV. Some in the art have found that lowering the cure state of the TPV can result in a TPV that is relatively "soft" without lowering the amount of "hard" phase in the TPV. Yet, at least in some situations, a soft and fully cured TPV is desired. Since the elastomer and the oil are the soft components, increasing these components can be viewed as a way of making a "soft" TPV. Achieving this, while maintaining the fully-cured nature of the elastomeric portion of the TPV, would be desirable.

Soft thermoplastic vulcanizates are described in EP 0 892 831, those thermoplastic elastomers have a hardness of less than 35 Shore A. The patentee demonstrates some TPVs having these "soft" Shore A values that possess at least 30 wt % thermoplastic. The softness is achieved at least in part due to the presence of amorphous thermoplastic in the TPV. Without this, the low level of thermoplastic alone results in products that are unprocessable. This is recognized in the art, such as in EP 0 109 375 B2, where in discussing the relative proportions of cured elastomer and plastic in dynamically vulcanized thermoplastic elastomers, the maximum amount of elastomer (i.e., the lowest amount of thermoplastic) is where the product crumbles and no longer retains the form of a mass.

TPVs comprising a thermoplastic polyolefin and a dynamically vulcanized elastomer having a low thermoplastic content are illustrated to have a hardness less than 35 Shore A in WO 2005/010094 A1 where the oil to elastomer ratio is at least 2/1. The examples illustrate a lowest level of the polypropylene thermoplastic at 5.12 wt % based upon the total weight of the thermoplastic elastomer composition, or 18.7 wt % on a total polymer basis (total of thermoplastic and elastomer). It also shows that with the lowest amounts of curative agent (least cure) the softest composition are obtained, and that higher levels of curative agent (greater cure) produce compositions with hardness of above 25 Shore A. The examples at higher levels of cure contained a total of 300 phr oil. This is consistent with the discussion by T. Abraham, C. McMahan in *Thermoplastic Elastomers: Fundamentals and Applications*, RUBBER COMPOUNDING: CHEMISTRY AND APPLICATIONS 163, 206-209 (Marcel Dekker, 2004), which illustrates the conversion of thermoplastic olefin blends (TPO) containing polypropylene, ethylene-propylene-diene monomer rubber (EPDM) and oil, into thermoplastic vulcanizates (TPV) by cross-linking the elastomer. Though many elastomeric properties are improved, the hardness (Shore A) of the compositions is shown to increase with each conversion. This hardness change (increase) is thought to be dependent on the change in morphology of the product and on the cross-linking of the elastomer phase. See also, A. Y. Coran, in *Vulcanization*, SCIENCE AND TECHNOLOGY OF RUBBER, 291-92 (Academic Press, F. R. Eirich, ed., 1978) (especially FIG. 1) where hardness for vulcanized elastomer is illustrated to increase with the crosslink density, that is, state of cure.

In view of the expanding use of thermoplastic elastomers, both thermoplastic vulcanizates and others (e.g., styrenic triblock thermoplastic elastomers), many efforts are being expanded to find those with best properties and produced using the most efficient manufacturing means. Considering the desirability of TPVs that are substantial cured, it would be advantageous to have a process for making TPV compositions also having a hardness on the Shore A equal to or lower than 25, yet being free of "powder", that is, pellets that are non-agglomerating and thus suitable for subsequent plastics processing.

SUMMARY OF THE INVENTION

One aspect of the invention is to a process for preparing a thermoplastic vulcanizate composition comprising melt blending less than 18 wt % thermoplastic polymer, based upon the total polymer basis, a cross-linkable elastomer, at least one curing agent and a processing oil such that the weight ratio of process oil to thermoplastic polymer ranges from 200:1 to 4:1; and isolating a thermoplastic vulcanizate composition exhibiting a level of extractables in room temperature cyclohexane not greater that 6 wt %, the composition having a durometer less than 50 Shore A.

Another aspect of the invention is to process for preparing a thermoplastic vulcanizate composition comprising:
i) melt blending a thermoplastic polymer with a cross-linkable elastomer under conditions of dynamic vulcanization;
ii) adding before, at or after the start of the melt blending in step i) at least one curative agent for the elastomer so as to cross-link the elastomer during the melt blending;
iii) introducing process oil into the melt blending of i) before, during, and/or after the addition of the curing agent, wherein the process oil is added in a ratio to the thermoplastic polymer established by the equation:

$$(-5.9T_P+365) \geq O_L \geq (-8.9T_P+243),$$

where $O_L$ represents the total process oil level in phr, $T_P$ represents the weight percent, on a total polymer basis, of the thermoplastic polymer and ranges from 1 to 60 wt %; and,
iv) extruding a thermoplastic vulcanizate blend of thermoplastic polymer and cross-linked elastomer that upon subsequent cooling has a level of extractables in room temperature cyclohexane of less than 6 wt % of the total weight of elastomer.

Yet another aspect of the invention is to a thermoplastic vulcanizate composition comprising less than 18 wt % thermoplastic polymer, based upon the total polymer basis, and a fully crosslinked elastomer exhibiting a level of extractables in room temperature cyclohexane not greater that 6 wt %, the composition having a durometer less than 50 Shore A.

DETAILED DESCRIPTION

Figure 1:
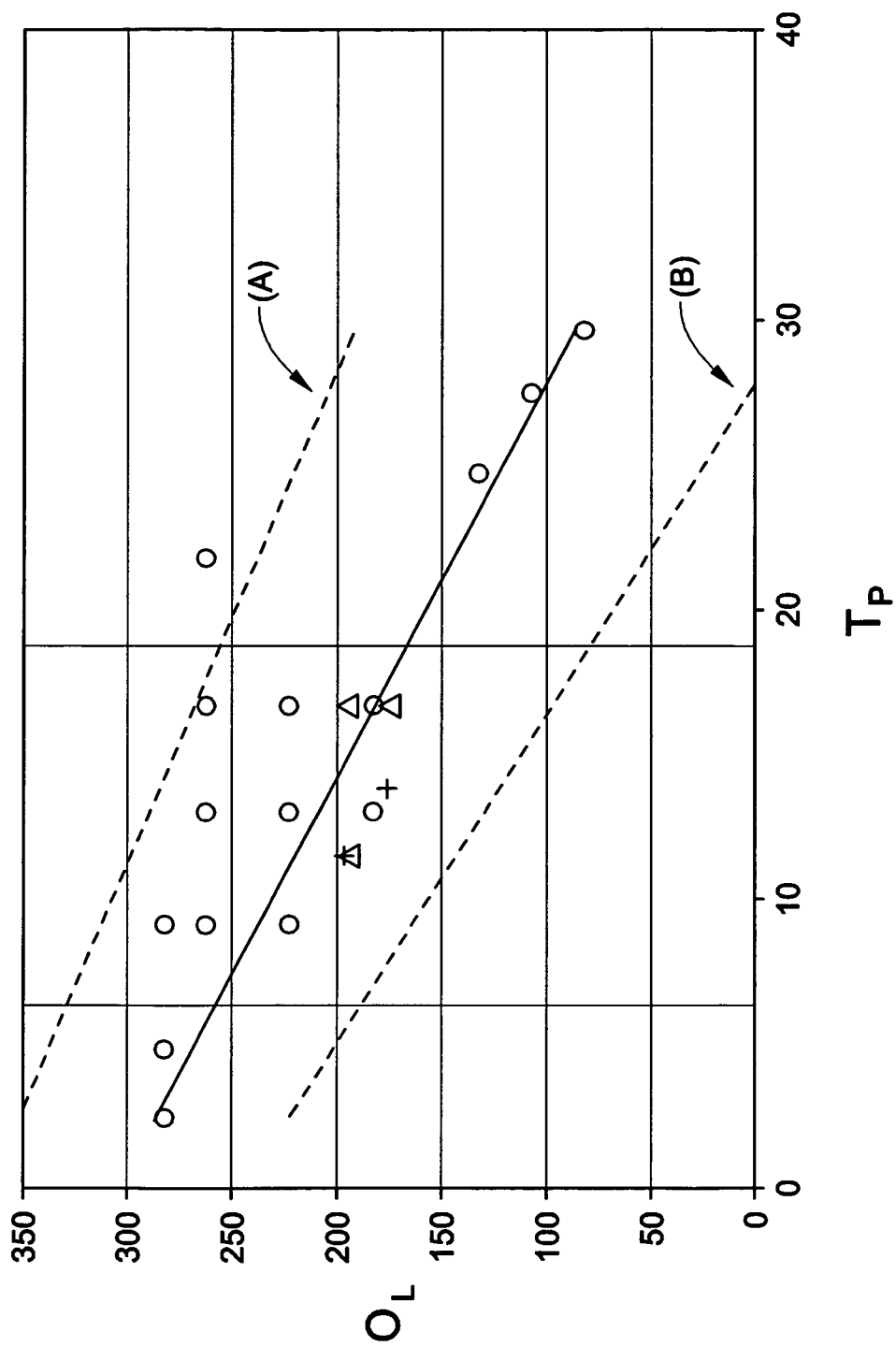
FIG. 1 illustrates in graphic form the relationship between the amount of processing oil added to the composition as a function of the amount of thermoplastic, in this embodiment polypropylene, present in the compositions of Examples 2, 8, 13, 17-21 illustrating the invention parameters.

The thermoplastic polymers used in the invention are solid plastic resin materials. Preferably, the resin is a crystalline or a semi-crystalline polymer resin, and more preferably is a resin that has a crystallinity of at least 10 percent as measured by differential scanning calorimetry. Polymers with a high glass transition temperature, for example, non-crystalline glassy engineering plastics, are also acceptable as the thermoplastic resin. The melt temperature of these resins should generally be lower than the decomposition temperature of the elastomer. Thus both polar and non-polar polymers can be utilized in the current invention. As used herein, reference to a thermoplastic polymer or thermoplastic resin or engineering resin includes a mixture of two or more different thermoplastic polymers or a blend of one or more compatibilizers and two or more different thermoplastic polymers.

Thermoplastic polymers preferably have a weight average molecular weight ($M_w$) from 50,000 to 600,000, and a number average molecular weight ($M_n$) from 50,000 to 200,000. More preferably, these resins have a $M_w$ from 150,000 to 500,000, and an $M_n$ from 65,000 to 150,000. The molecular weight can typically be determined by gel permeation chromatography (GPC) using a suitable standard for the thermoplastic being measured. Additionally, $M_n$ can be measured using Differential Refractive Index (DRI) and $M_w$ can be measured using Low Angle Laser Light Scattering (LALLS). ASTM D 6474 provides a general description for polyolefins, see also ISO 11344 and T. Sun in 34 MACROMOLECULES 6812 (2001) for adaptation for synthetic elastomer.

Exemplary thermoplastic polymers include crystallizable polyolefins, polyimides, polyamides (nylons), polyesters, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, fluorine-containing thermoplastics, and polyurethanes. The preferred thermoplastic resins are the crystallizable polyolefins that are formed by polymerizing α-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. For example, known polyethylene homo- and copolymers having ethylene crystallinity are suitable. Isotactic polypropylene and crystallizable copolymers of propylene and ethylene or other $C_4$-$C_{10}$ α-olefins, or diolefins, having isotactic propylene crystallinity are preferred. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also suitable. These will include reactor polypropylene copolymers and impact polypropylene copolymers, whether block, random or of mixed polymer synthesis. These homopolymers and copolymers may be synthesized by using any catalyst known in the art such as, but not limited to, the chromium oxide and organo-chromium catalysts, titanium-based Ziegler-Natta type catalysts, metallocene catalysts, vanadium-based catalyst, and iron, nickle or palladium-based coordination catalysts; processes include slurry or solution phase polymerizations (high and low pressure) or gas phase processes. The term "copolymer", as used throughout the description and claims, means a polymer comprising two or more monomer derived units.

The thermoplastic polyolefin resins generally have a melt or softening temperature (Tm) that is from 40 to 350° C., the preferable polyolefin resins from 50 to 175° C., and even more preferably from 90 to 170° C. The glass transition temperature (Tg) of these resins is from −25 to 10° C., preferably from −5 to 5° C. More generally speaking, including the semi-crystalline and glassy polar polymers, useful resins will have a Tg of up to and greater than 100° C., and even greater than 150° C. The characterizing temperatures are can be determined by DSC according to the test method of ASTM D-3418.

An especially preferred commercially available thermoplastic polyolefin resin is highly crystalline isotactic or syndiotactic polypropylene. This polypropylene generally has a density of from 0.85 to 0.91 g/cm$^3$, with the largely isotactic polypropylene having a density of from 0.90 to 0.91 g/cm$^3$. Also, high and ultra-high molecular weight polypropylene that has a fractional melt flow rate is highly preferred. These polypropylene resins are characterized by a melt flow rate less than or equal to 50 dg/min, and preferably less than or equal to 35 dg/min, and more preferably less than or equal to 5 dg/min, and most preferably less than or equal to 0.8 dg/min per ASTM D-1238. Melt flow rate is a measure of how easily a polymer flows under standard pressure, and is measured by using ASTM D-1238 at 230° C. and 2.16 kg load. The use of more than one propylene homopolymer, or copolymer, having different melt flow rates, from less than or equal to 0.8 dg/min to 50 dg/min is also an embodiment of the invention.

In certain embodiments of this invention, the thermoplastic vulcanizate may likewise include one or more polymeric processing additives or property modifiers. A processing additive that can be employed is a polymeric resin that has a very high melt flow index. These polymeric resins include both linear and branched molecules that have a melt flow rate that is greater than 500 dg/min, or greater than 750 dg/min, or greater than 1000 dg/min, or greater than 1200 dg/min, or greater than 1500 dg/min. The thermoplastic elastomers of the present invention may include mixtures of various branched or various linear polymeric processing additives, as well as mixtures of both linear and branched polymeric processing additives. Reference to polymeric processing additives will include both linear and branched additives unless otherwise specified. One type of linear polymeric processing additive is polypropylene homopolymers. One type of branched polymeric processing additive includes diene-modified polypropylene polymers. Thermoplastic vulcanizates that include similar processing additives are disclosed in U.S. Pat. No. 6,451,915.

Thermoplastics which can be added for property modification include additional noncrosslinkable elastomers, including non-TPV thermoplastics and thermoplastic elastomers. Examples include polyolefins such as polyethylene homopolymers and copolymers with one or more $C_3$-$C_8$ α-olefins. Specific examples include ethylene-propylene rubber ("EPR"), ultra-low density polyethylene ("ULDPE"), very-low density polyethylene ("VLDPE"), linear low density polyethylene ("LLDPE"), medium density polyethylene ("MDPE"), high density polyethylene ("HDPE"), and particularly those polyethylenes commonly known as "plastomers" which are metallocene catalyzed copolymers of ethylene and $C_4$-$C_8$ having a density of 0.870 to 0.920 g/cm$^3$. Propylene based elastomeric copolymers of propylene and 8-20 weight % of ethylene, and having a crystalline melt point (60-120° C.) are particularly useful with a polypropylene based thermoplastic phase. Other thermoplastic elastomers having some compatibility with the principal thermoplastic or the elastomer, may be added such as the hydrogenated styrene, butadiene and or isoprene, styrene triblock copolymers ("SBC"), such as SEBS, SEPS, SEEPS, and the like. Non-hydrogenated SBC triblock polymers will serve as well, for instance, styrene-isoprene-styrene, styrene-butadiene-styrene, and styrene-(butadiene-styrene)-styrene, where there is a rubbery mid-block with thermoplastic endblocks.

Elastomers suitable for use in the compositions of the invention are generally chosen to be suitable for use with the thermoplastic polymer and have reactive cure sites. Thus thermoplastic polyolefin polymers will typically be used with cross-linkable, non-polar olefinic elastomers or blends of two or more types of elastomers. The cure sites can either be an integral part of the elastomer backbone or can be incorporated by additional functional groups. As used herein, reference to an elastomer includes a mixture of two or more different elastomers.

Unsaturated non-polar elastomers useful to prepare thermoplastic elastomers according to the invention include monoolefin copolymer elastomers comprising non-polar, rubbery copolymers of two or more monoolefins (EPR rubber), preferably copolymerized with at least one polyene, usually a diene (EPDM rubber). EPDM is a polymer of ethylene, propylene and one or more non-conjugated diene(s), and the monomer components may be polymerized using, for example, Ziegler-Natta or metallocene catalyzed reactions. Satisfactory non-conjugated dienes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (VNB); divinyl benzene, and the like, or combinations thereof. Such elastomers have the ability to produce thermoplastic vulcanizates with a cure state generally in excess of 95 percent (e.g., less than 6 wt % elastomer being extractable in suitable solvent) while maintaining physical properties attributable to the crystalline or semi-crystalline polymer.

The preferred diene monomers are 5-ethylidene-2-norbornene and 5-vinyl-2-norbornene. In the event that the copolymer is prepared from ethylene, α-olefin, and diene monomers, the copolymer may be referred to as a terpolymer or even a tetrapolymer in the event that multiple olefins or dienes are used.

The elastomeric copolymers contain from 20 to 90 mole percent ethylene units derived from ethylene monomer. Preferably, these copolymers contain from 40 to 85 mole percent ethylene derived units, and even more preferably from 50 to 80 mole percent ethylene derived units. Furthermore, where the copolymers contain diene units, the diene units can be present in an amount from 0.1 to 5 mole percent, preferably from 0.2 to 4 mole percent, and even more preferably from 1 to 2.5 mole percent. The balance of the copolymer will generally be made up of units derived from x-olefin monomers. Accordingly, the copolymer may contain from 10 to 80 mole percent, preferably from 15 to 50 mole percent, and more preferably from 20 to 40 mole percent α-olefin units derived from x-olefin monomers. The foregoing mole percentages are based upon the total moles of the polymer.

Butyl rubbers are also useful in the thermoplastic elastomer compositions. As used in the specification and claims, the term butyl rubber includes copolymers of an isoolefin and a conjugated diolefin, terpolymers of an isoolefin with or without a conjugated diolefin, divinyl aromatic monomers and the halogenated derivatives of such copolymers and terpolymers. The halogenated versions thereof are particularly useful, especially brominated butyl rubber. Another suitable copolymer within the scope of the olefin elastomer of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from 0.1 to 10 wt %. A preferred example is the brominated copolymer of isobutylene and para-methylstyrene.

The elastomeric copolymers preferably have a weight average molecular weight that is greater than 200,000, more preferably from 300,000 to greater than 1,000,000, even more preferably from 400,000 to greater than 700,000. These copolymers preferably have a number average molecular weight that is greater than 70,000, more preferably from 100,000 to 350,000, even more preferably from 120,000 to 300,000, and still more preferably from 130,000 to 250,000. Elastomers, especially those in the high end of the molecular weight range, are often oil extended in the manufacturing process and can be directly processed as such in accordance with the invention process.

Useful elastomeric copolymers preferably have a Mooney Viscosity ($M_L(1+4@125°$ C.)) of from 20 to 450, more preferably from 50 to 400, and even more preferably from 200 to 400, where the Mooney Viscosity is that of the non-oil extended polymer. In some embodiments, the elastomeric copolymers can have a negligible melt flow rate (MFR) as determined in accordance with ASTM D-1238 at 230° C. at a load of 2.16 kg, more specifically preferably has an MFR of less than 0.1 g/10 min, more preferably less than 0.05 g/10 min. In others, a higher MFR in the range of 0.1 to 100 g/10 min, and preferably 0.5 to 50 g/10 min can be used.

The vulcanizable elastomer can also be natural rubbers or synthetic homo- or copolymers of at least one conjugated diene with an aromatic monomer, such as styrene, or a polar monomer such as acrylonitrile or alkyl-substituted acrylonitrile monomer(s) having from 3 to 8 carbon atoms. Those elastomers are higher in unsaturation than EPDM elastomer or butyl rubber. Those elastomers can optionally be partially hydrogenated to increase thermal and oxidative stability. Desirably those elastomers have at least 50 weight percent repeat units from at least one conjugated diene monomer having from 4 to 8 carbon atoms. Other comonomers desirably include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms.

The synthetic elastomer is preferably nonpolar. Examples of synthetic elastomers include, in addition to the ethylene copolymer elastomers above, synthetic polyisoprene, polybutadiene elastomer, styrene-butadiene elastomer. These materials are commercially available. Non-polar elastomers are preferred; polar elastomers may be used but may require the use of one or more compatibilizers, as is well known to those skilled in the art.

In the reactive processing of thermoplastic vulcanizates, the thermoplastic component(s) is added, or fed, to the melt processing equipment typically in pellet or powder form while the crosslinkable elastomer is added in crumb, particles from granulation or pulverization, or pellet form (often dusted with a filler or semi-crystalline polymer powder) to enhance physical mixing in the feed throat. Alternatively, both thermoplastic and elastomer may be fed directly in molten form together, or independently.

Curatives, or curing agents (curative plus catalysts and coagent(s)) that may be used in the invention for cross-linking, or vulcanizing, the elastomers can be any of those known to those skilled in the art for processing vulcanizable elastomer, or more particularly, thermoplastic vulcanizates, including silicon hydrides, phenolic resins, peroxides, free radical initiators, sulfur, zinc metal compounds and the like. The named curatives are frequently used with one or more coagents that serve as initiators, catalysts, etc. for purposes of improving the overall cure state of the elastomer. The curatives may be added in one or more locations, including the feed hopper of a melt mixing extruder. For more information see, S. Abdou-Sabet, R. C. Puydak, and C. P. Rader in *Dynamically Vulcanized Thermoplastic Elastomers,* 69(3) RUBBER CHEMISTRY AND TECHNOLOGY (July-August 1996).

Examples of organic peroxides that may be used are di-tert-butyl peroxide, dicumyl peroxide, t-butylcumyl peroxide, α-α-bis(tert-butylperoxy)diisopropyl benzene, 2,5-dimethyl-2,5-di(t-butylperoxy)hexane, 1,1-di(t-butylperoxy)-3,3,5-trimethyl cyclohexane, n-butyl-4,4-bis(tert-butylperoxy) valerate, benzoyl peroxide, lauroyl peroxide, dilauroyl peroxide, 2,5-dimethyl-2,5-di(tert-butylperoxy) 3-hexene, and in general, diaryl peroxides, ketone peroxides, peroxydicarbonates, peroxyesters, dialkyl peroxides, hydroperoxides, peroxyketals and combinations thereof. Azo initiators such as Luazo® AP (available from ATO Chemical) may also be used as free radical initiators.

In addition to the peroxide, other cure adjuvants or coagents can be used. Examples are triallyl cyanurate, triallyl isocyanurate, triallyl phosphate, sulfur, N-phenyl bis-maleamide, zinc diacrylate, zinc dimethacrylate, divinyl benzene, 1,2-polybutadiene, trimethylol propane trimethacrylate, tetramethylene glycol diacrylate, tri functional acrylic ester, dipentaerythritolpentacrylate, polyfunctional acrylate, polyfunctional methacrylates, acrylate and methacrylate metal salts, and oximer, e.g. quinone dioxime.

Hydrosilylation can also be used a crosslinking method for thermoplastic vulcanizates and is suitable in one embodiment. In this method a silicon hydride having at least two SiH groups in the molecule is reacted with the carbon-carbon multiple bonds of the unsaturated (i.e. containing at least one carbon-carbon double bond) elastomer component of the thermoplastic elastomer, in the presence of the thermoplastic resin and a hydrosilylation catalyst. Silicon hydride compounds useful in the process of the invention include methylhydrogen polysiloxanes, methylhydrogen dimethyl-siloxane copolymers, alkyl methyl polysiloxanes, bis(dimethylsilyl)alkanes and bis(dimethylsilyl)benzene.

Platinum-containing catalysts which are useful with the silicon hydride compounds for improved cure in the process of the invention are known. These catalysts include chloroplatinic acid, chloroplatinic acid hexahydrate, complexes of chloroplatinic acid with sym-divinyltetramethyldisiloxane, dichloro-bis(triphenylphosphine) platinum (II), cis-dichloro-bis(acetonitrile) platinum (II), dicarbonyldichloroplatinum (II), platinum chloride and platinum oxide. Zero valent platinum metal complexes such as Karstedt's catalyst are particularly preferred.

Any phenolic curative which fully cures EPDM is suitable in the practice of the invention. The use of conventional phenolic resin curatives for crosslinking EPDM in a thermoplastic elastomer is disclosed in U.S. Pat. No. 4,311,628. For further details of phenolic curative systems see "Vulcanization and Vulcanizing Agents," W. Hoffman, Palmerton Publishing Company. Suitable phenolic curing resins and brominated phenolic curing resins are commercially available under the trade names SP-1045, HRJ14247A, CRJ-352, SP-1055 and SP-1056 from Schenectady Chemicals, Inc. Similar functionally equivalent phenolic curing resins may be obtained from other suppliers. The amount of phenolic resin needed to completely cure can depend on the type of curing agent selected.

The elastomer may be partially of fully cured or crosslinked using such curatives. In one embodiment, the elastomer is advantageously completely or fully cured. This is typically achieved when curative is added in an amount equal to from 1.6 or 3 or 5 to 8 or 10.0 parts per hundred parts rubber (phr), depending upon the selection of curative, efficiency of mixing, operating temperature and the like. The degree of cure can be measured by determining the amount of elastomer that is extractable from the thermoplastic vulcanizate by using cyclohexane or boiling xylene solvents as an extractant. Partially cured elastomer will have as much as 50 wt % extractable in solvent, and generally more than 6 wt % extractable. In preferred embodiments, the elastomer has a degree of cure where less than 6 wt %, in other embodiments not more than 4 wt %, in other embodiments not more than 3 wt %, and in other embodiments not more than 2 wt % is extractable by cyclohexane at 23° C. in 48 hours.

Often the thermoplastic polymer and vulcanizable elastomer, or vulcanized elastomer alloys of the composition may be combined with a compatibilizer for these components. Compatibilizers are well known in the art and include block copolymers having one block that is compatible with one component and at least one other block that is compatible with at least one other of the principal components. Other examples would include functionalized polymers having a backbone polymer that is compatible with one of the principal components and a graft moiety that is either compatible or reactive with at least one of the other principal components.

Compatibilizer forming thermoplastics ("compatiblizers") may also be used. The compatibilizer can be formed by the direct interaction of polymeric segments containing the functional groups present in the major components, i.e. the thermoplastic polymer and the vulcanizable or vulcanized elastomer, or by interaction with another bi- or multi-functional compound. Such compatibilizers are known in the art such as described in A26(8) JOURNAL OF MACRO MOLECULAR SCIENCE CHEMISTRY 1211 (1989). Where the thermoplastic polymer is a polyamide, the preferred compatibilizer includes the reaction product of nylon and functionalized polypropylene which is prepared by melt mixing nylon (6) with polypropylene grafted with 0.1 to 2.0 weight percent maleic anhydride in the ratio of nylon:maleated polypropylene ranging from 95:5 to 50:50. See 18 APPL. POLYM. SCI. 963 (1974) and 26 EUR. POLYM. J. 131 (1990). For example, a maleated polyolefin may be selected for its compatibility with an olefinic vulcanizable or vulcanized elastomer and reactivity with the polyamide engineering resin. Other compatibilizer forming materials such as an epoxy group grafted to a polypropylene molecule or an oxazoline group grafted to an olefin would also be appropriate to form a compatibilizer for a polyamide and polyolefinic vulcanizate blend. Maleated SEBS or SEPS, etc., can function similarly in view of their polyolefinic midblock. For purposes of this invention, a compatibilizer forming material is defined as a functionalized polyolefin or graft and/or block copolymer which acts to form a compatibilizer when grafted to an engineering resin.

The compatibilizer will typically be present in a compatibilizing amount, e.g., from 1 to 20 wt %, based upon the total weight of the composition, preferably 5 to 15 wt %, and more preferably 5 to 10 wt %.

Fillers can be inorganic fillers, such as calcium carbonate, clays, silica, talc, titanium dioxide, or organic carbon black, reinforcing glass or polymeric fibers or microspheres, and any combinations thereof. Any type of carbon black can be used, such as channel blacks, furnace blacks, thermal blacks, acetylene blacks, lamp blacks, combinations thereof and the like. These fillers can be added during the preparation of the vulcanizate, before, during or after vulcanization of the rubber, or during the preparation of the finished composition, or some portions thereof in both, provided that the total amount of these additives does not exceed about 75 weight percent, based on the total thermoplastic elastomer composition, including the additives.

Additionally, the TPV as prepared may be finished by pelletization in accordance with known methods for plastic pelletization. Such pellets advantageously can serve as elastomer particle-containing intermediate (or TPV concentrate) having a minimum of the original thermoplastic (e.g., from 1 wt % to less than 18 wt % thermoplastic polymer based upon the total of thermoplastic and non-oil extended elastomer) such that additional thermoplastic, whether the same, similar or completely different, can be added in subsequent melt blending steps in the same or additional extruder. Any of the other additives or modifiers can be similarly added in this manner.

Adverse interactions between the curing agents and fillers can be thus be avoided. For instance, the known scission of polypropylene polymers, or cross-linking of polyethylene, in the presence of peroxide curing agents, can be avoided since the curing reaction can be generally conducted so as to at least nearly exhaust the reactive curing agents. Accordingly, the invention also includes a process for preparing an additive modified thermoplastic elastomer composition comprising a) introducing in pellet form a thermoplastic vulcanizate according to the description above into a melt blending process; b) adding a modifying amount of any one or more of additives selected from additional thermoplastic polymers, thermoplastic polymeric modifiers, solid particulate fillers, extender or process oils, and colorants.

Extender and process oils are particularly useful as plasticizers in the reactive processing of the invention. Elastomer extender and process oils have particular ASTM designations depending on whether they fall in a class of paraffinic, naphthenic, or aromatic process oils derived from petroleum fractions. The type of process oils utilized will be customarily used in conjunction with the elastomer component. The ordinary skilled person will recognize which type of oil should be utilized for a particular elastomer and thermoplastic combination. A portion of the process oil is often included in the elastomer as acquired (oil-extended elastomer). Oils other than petroleum-based oils, such as oils derived from coal tar and pine tar can also be utilized. In addition to petroleum-derived elastomer process oils, oligomeric and low molecular weight polymer oils from unsaturated monomers, e.g., poly-α-olefins, separated from petroleum fractions, organic esters and other known synthetic plasticizers can be used.

Additives that promote lubrication and slip such as fatty amides (for example Kemamide™ E or U supplied by Crompton Corp) can be used to modify the thermoplastic polymer in the TPV composition. Such type of additives and others can be added after the cure, in the same step or in a separate step in a neat or concentrate pellet, powder, or granule form, or as a liquid (melt or solution) into the feed throat or down stream directly in to the processing section of the extruder mixer. The feed can be split into more than one feed location to prevent slip or loss of mixing. A preferred method can include the use of an additive melting systems coupled with loss in-weight or Corialis mass flow meter feed systems to deliver the additives to the process. In cases where it is of interest to keep the additives in the TPV, to minimize lossess, it is advantageous to add them with appropriate screw design with melt seals, after any vent zone, especially if the additives have a higher volatility (lower boiling points).

Any melt processing equipment can be used in the process of the current invention. One or more pieces of processing equipment can be used, either in tandem or series, preferably tandem. Examples of processing equipment include Buss-co kneader, planetary extruder, co- or counter rotating multi-screw screw extruders, with two or more screw tips, co-rotating intermixing extruder with two or more screws, ring extruder or other polymer processing crosslinkable elastomer devices capable of mixing the oil, thermoplastic, cure agents, catalyst and can generate high enough temperature for cure can be used in the practice of current invention. The term screw tips refers to the leading edge of the flights of the extruder screws. A twin screw extruder (TSE) of type 3 screw tips (ZSK 53) diameter 53 mm, L/D 44, from Coperion Co., a ring extruder with 12 screw shafts arranged concentrically, diameter 30 mm, L/D 44, from Century, Inc. and, a mega-compounder diameter 58 mm, L/D 60, from Coperion Co. have been used to illustrate the invention by examples noted. In each, the screws are intermeshing and co-rotating. The twelve screws in the ring extruder used are arranged in fixed positions in a circle, like the face of a clock, and are geared to the same motor, and rotate at the same speed. An example of a ring extruder is described in WO 2004/009327 A1. An embodiment of the mega-compounder is more fully described in U.S. Pat. No. 6,042,260. In one embodiment, more than one melt-processor or extruder may be used, such as in a tandem arrangement. Preferably, melt-blending takes place with materials being in the melted or molten state.

In a continuous process, the materials may be mixed and melted in an extruder for dynamic curing, or mixed and melted in one extruder and passed to another extruder as a melt, or as a pellet if pelletized between extruders, for further dynamic curing. Also, the mixing of polymeric components with or without curing agents may be carried in one or more of melt compounders and then the curing is carried out in one or more extruders. Other arrangements and dynamic vulcanization processing equipment known to those skilled in the art may be used according to processing requirements. The processing may be controlled as described in U.S. Pat. No. 5,158,725 using process variable feedback.

In the dynamic vulcanization of thermoplastic elastomer blends, especially those blends containing a majority of elastomer, in the early stages of mixing, as the two ingredients are melted together, the lower temperature-melting elastomer comprises a continuous phase of a dispersion containing the thermoplastic polymer. As the thermoplastic melts, and the cross-linking of the elastomer takes place, the cured elastomer is gradually immersed into the molten thermoplastic polymer and eventually becomes a discontinuous phase, dispersed in a continuous phase of thermoplastic polymer. This is referred to as phase inversion, and if the phase inversion does not take place, the thermoplastic polymer may be trapped in the cross-linked elastomer network of the extruded vulcanizate such that the extrudate created will be unusable for fabricating a thermoplastic product. For temperature, viscosity control and improved mixing, the process oil is added at more than 1 location along screw axis, such as 2-5 locations, preferably 2-4 locations. The addition of oil can be before, during, or after cure.

One aspect of the invention is to a process for preparing a thermoplastic vulcanizate composition comprising melt blending less than 18 or 17 or 16 or 12 or 10 or 8 or 6 wt % thermoplastic polymer, based upon the total polymer basis, an elastomer, a curative and an oil such that the weight ratio of oil to thermoplastic ranges from 200:1 or 180:1 or 150:1 or 140:1 to 30:1 or 10:1 or 8:1 or 5:1 or 4:1; and isolating a thermoplastic vulcanizate composition exhibiting a level of extractables in room temperature cyclohexane not greater that 6 wt %, the composition having a durometer less than 50 or 40 or 30 or 25 Shore A, wherein any desirable upper limit of oil: thermoplastic can be combined with any desirable lower limit of oil:thermoplastic described herein. In another embodiment of this aspect of the invention, the amount of thermoplastic combined ranges from 1 or 4 or 6 to 16 or 18 wt %.

FIG. 1 is provided to illustrate another aspect of the invention. The y-axis of the graph is the amount of process oil in phr and it includes oil extension in the elastomer, process oil added with the cure agent, and additional oil directly injected into the extruder. The x-axis of the graph is the amount of thermoplastic, polypropylene homopolymer in the examples, in wt % based on total weight of polymer. The open circles ("O") in the graph represent data for the conditions where a processable, fully-cured thermoplastic elastomer were produced in the examples. The triangle symbols ("Δ") represent data from examples 32-34.

The lines (A) and (B) in FIG. 1 represent upper and lower thresholds for the processable and non-processable thermoplastic elastomers. The term "processable" here means the thermoplastic elastomer has the capability for a "continuous" thermoplastic phase on processing, for example, by melt extrusion of the product in further compounding or finishing.

The relation between the minimum or threshold total oil phr content and the minimum wt % of a thermoplastic ("$T_P$")
for thermoplastic elastomer compositions of the invention in the hardness range from, in one embodiment 5 Sh A to 83 Sh A, is described in one embodiment by the equation (1):

$$(-5.9T_P+365) \geq O_L \geq (-8.9T_P+243), \qquad (1)$$

where $O_L$ is always a number greater than zero and represents the total process oil level in phr, $T_P$ represents the weight percent, on a total polymer basis, of the thermoplastic polymer and ranges from 1 or 2 or 3 or 4 wt % to 60 or 50 or 30 or 25 or 18 or 8 wt %.

More preferably, the relation between the minimum or threshold total oil phr content and the minimum wt % of a thermoplastic ("$T_P$") for thermoplastic elastomer compositions of the invention in the hardness range from, in one embodiment 5 Sh A to 83 Sh A, is described in one embodiment by the equation (2):

$$(-6.3T_P+350) \geq O_L \geq (-8.5T_P+258), \qquad (2)$$

Where $O_L$ and $T_P$ are as defined above.

Most preferably, the relation between the minimum or threshold total oil phr content and the minimum wt % of a thermoplastic ("$T_P$") for thermoplastic elastomer compositions of the invention in the hardness range from, in one embodiment 5 Sh A to 83 Sh A, is described in one embodiment by the equation (3):

$$(-6.7T_P+334) \geq O_L \geq (-7.0T_P+289), \qquad (3)$$

Where $O_L$ and $T_P$ are as defined above.

The slope and intercept of equations (1)-(3) can be influenced, for example, by changes to screw design, properties of thermoplastic, and/or properties of EPDM. For example a lower molecular weight elastomer will require a lower amount of minimum thermoplastic at a given phr of oil. Similarly, a higher molecular weight elastomer can require a higher amount of thermoplastic, in the present examples polypropylene ("PP"), given in weight percent at a given parts per hundred parts rubber (phr). When moving below the threshold process conditions of the equation (for example lowering the amount of thermoplastic to below the line (B) of FIG. 1 at an oil phr level, or at a given wt % of thermoplastic, lowering the oil phr to below that equation line), the pellets begin to show a rougher surface, and processed polymer began to block the melt filtration mesh screen, preventing continued processing. If not caught by the filter, this may result in powdery particles of elastomer largely incapable of further plastic processing or compounding.

Figure 2:
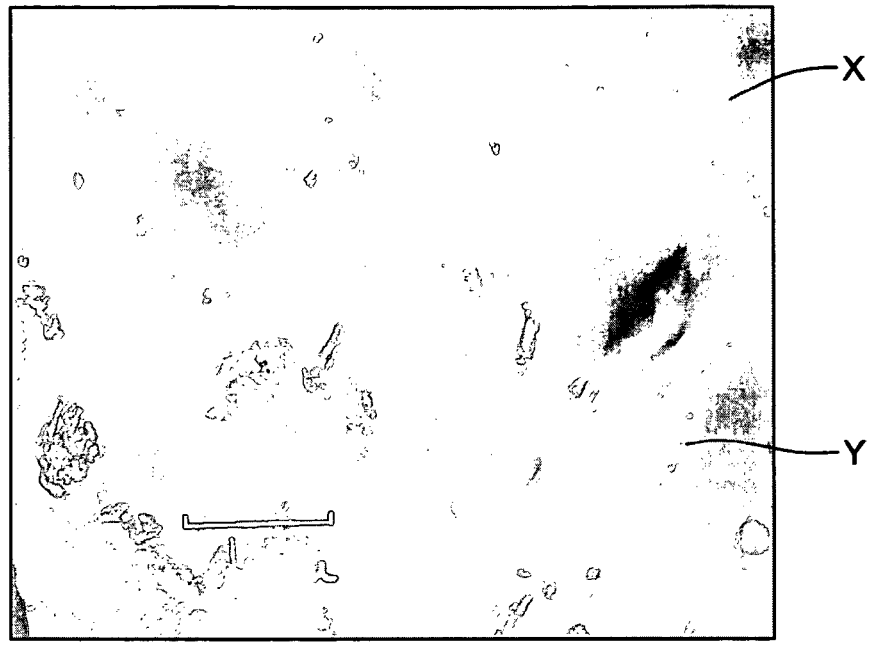
FIG. 2 illustrates an Atomic Force Microscopy (AFM) image of the thermoplastic vulcanizate of example 19.
Figure 3:
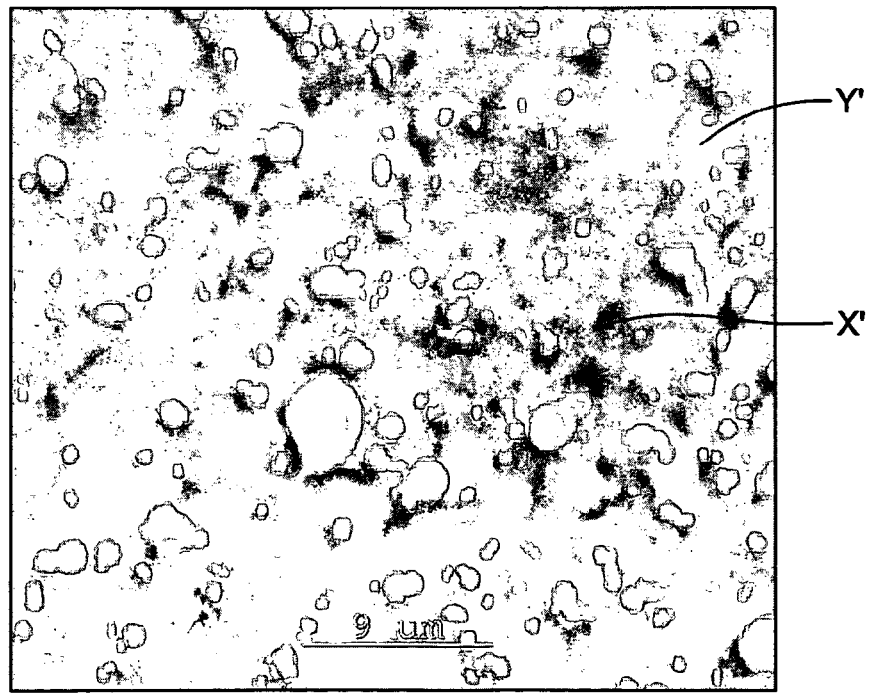
FIG. 3: Illustrates a Scanning Electron Microscopy image of a thermoplastic vulcanizate of example 12.

With reference now to FIG. 2, an atomic force microscope image of a thermoplastic vulcanizate of example 19. The thermoplastic vulcanizate (2) shows a distribution of small elastomer particles shown as the dark contrast color (X) in a thermoplastic polymer shown as a lighter color (Y). Although elastomer particles in (2) are thermoset and are fully cross linked, their dispersion in thermoplastic polymer makes it possible for thermoplastic vulcanizate (2) to be reheated and shaped for final production, elimination of scrim, and eventual recycling, without loss of mechanical properties. FIG. 3 shows a Scanning Electron Micrograph (SEM) image of thermoplastic vulcanizate (3) for the example 12 (13.8 Sh A), having a lower amount of thermoplastic relative to TPV (2). The thermoplastic vulcanizate (3) shows a distribution of small elastomer particles in the lighter color (Y') in a continuous phase of thermoplastic polymer shown in darker contrast color (X'). For the SEM image the samples were cyro-microtomed at −130° C. using PowerTome XL machinery and purged with dry $N_2$ in a dessicator prior to staining. Staining was performed using a $RuO_4$ solution for 75 minutes. The SEM images were taken using secondary electron imaging with IS-DS130 SEM.

In accordance with one aspect of the invention, it has been found that it is possible, by reducing the amount of thermoplastic polymer used in the thermoplastic vulcanizate composition, to produce very soft materials using high modulus or highly crystalline thermoplastic polymers, wherein high service temperature use is not compromised, and a clean (non-bleeding or non-extruding), non-tacky extrudate product, even after pelletization, is provided. The very soft compositions can contain process oil in phr relative to thermoplastic polymer in the ratio of, for example, 177:1 to 30:1 (thermoplastic polymer 2.0-6.3 wt %) in one embodiment. Soft compositions can contain process oil in phr relative to thermoplastic polymer in the ratio of from, for example, 177:1 to >4.2:1 (thermoplastic polymer 2.0 wt % to 18.7 wt %) in yet another embodiment. Medium hardness compositions can contain process oil in phr relative to thermoplastic polymer in the rate ratio of, for example, 4.2:1 to 0.34:1 (thermoplastic >18.7 wt %) in yet another embodiment. The process oil can be added before, during and/or after cure with a screw design capable of mixing it, and preferably is added partially in or near the feed throat, at or near the start up of vulcanization, and again at or after substantial completion of the crosslinking reaction. Thus the an aspect of the invention is to produce TPV compositions with a maximum amount (total polymer basis) of crosslinkable elastomer in the formulation due to the ability to use minimum oil phr and thermoplastic.

Thus, another aspect of the invention is to the use of a thermoplastic vulcanizate composition in forming pellets or an article of manufacture, the thermoplastic vulcanizate comprising from 1 to 18 or 17 or 16 or 12 or 10 or 8 or 6 wt % thermoplastic polymer, based upon the total polymer, and a fully crosslinked elastomer exhibiting a level of extractables in room temperature cyclohexane not greater that 2 or 4 or 6 wt %, the composition having a durometer less of than 50 or 40 or 30 or 25 Shore A.

In additional embodiments of the invention, additional thermoplastic polymer may be added to the polymer melt after addition of the curatives, in the same or a different extruder. In such an embodiment, the additional thermoplastic polymer may be added for its compatibilizing ability, or may be the same as the initial thermoplastic, e.g., polypropylene, or it may be added for its engineering properties, for example, polar thermoplastics such as polyamide or polyester. Thus in some embodiments, the thermoplastic polymer comprises one or a plurality of different thermoplastic materials, and further comprises the step of adding such thermoplastic polymers at various locations in the extruder during the extrusion. The added thermoplastic polymer may be added in pellet or molten form, or such other form as may be useful under the conditions employed, and may be added to downstream ports using pellet crammers or melt feeding extruders. Properties of a vulcanizate can be modified by adding a portion of the thermoplastic polymer at the feed throat and one or more portions are added in at least one additional location on the extruder after the addition of curative. In another embodiment, an additional portion of thermoplastic polymer is added in at least one location on the extruder before addition of curative. Using such approaches can affect the energy of processing, can reduce the temperature and thus improve control of the curing zone, can improve the reaction kinetics an efficiency of the curing reaction, and otherwise make the processing more efficient.

When the thermoplastic polymer is present in a low amount, for example, amount greater than 1.0 wt % but less than 18 or 17 wt % based upon the total weight of thermoplastic polymer plus elastomer, as indicated above, a preferred process for making compatiabilized blends includes a thermoplastic polymer that is, or contains, a compatibilizer or compatiblizer forming thermoplastic; and wherein the process may further comprise pelletizing the thermoplastic vulcanizate; and, melt processing the pellets formed with at least one more additional thermoplastic polymer. An alternative process is wherein the thermoplastic polymer is or contains a compatibilizer or compatiblizer forming thermoplastic, and wherein the process further comprises introducing after cure into the processing one or more additional thermoplastic polymer that may be the same or different than the original thermoplastic polymer. A further alternative process is one comprising the steps of a) pelletizing the thermoplastic vulcanizate composition of the invention, b) adding into subsequent melt processing of the pellets formed in a) a compatibilizer or compatiblizer forming thermoplastic, and c) adding therewith or subsequently at least one different thermoplastic than that of the thermoplastic vulcanizate.

The melt temperature of thermoplastic polymers used to produce thermoplastic vulcanizates may be as low as 50-175° C., for example syndiotactic polypropylene, whereas the melting point of nylon, for example, can be as high as 350° C. The friction and viscous dissipation created in the material, as it is sheared and dispersed, determines the temperature of the material in the melt zone. As the pellets or granulated material begins to melt, friction decreases, and the temperature levels off, but can be further manipulated depending on processing requirements. Cross-linking of elastomer, depending somewhat on the functional groups present, and the chemistry of the elastomer, usually takes place between 165 and 250° C., and for most elastomers used in the processing of thermoplastic vulcanizates, cross-linking takes place between 175 and 230° C.

As is apparent from the foregoing description and the following examples, a mixture of two or more thermoplastic polymers may be used to form a thermoplastic vulcanizate, and mixtures of two or more elastomers may be used. Curatives may be added in solid form or in solution, and solution catalysts may be concentrated or dilute. Oil may be added in one location or a plurality of locations, in order to control the temperature and the consistency of the composition as it is being processed, as well as to control the properties of the vulcanizate.

EXAMPLES

In the Examples below the following commercial materials were used (Table 1):

TABLE 1

| F008F | PP homopolymer, MFR 0.8 (g/10 min). | Sunoco Inc. (Chemicals) |
| F180A | PP homopolymer, MFR 20.0 (g/10 min) | Sunoco Inc. (Chemicals) |
| PP5341 | PP homopolymer, MFR 0.83 (g/10 min) | ExxonMobil Chemical Co |

TABLE 1-continued

| | | |
|---|---|---|
| D008M | PP homoploymer, MFR 0.8 (g/10 min). | Sunoco Inc. (Chemicals) |
| VISTALON ® 3666 (V3666) | ethylene-propylene-ethylidene-norbornene, Mooney ML (1 + 4, 125° C.) 50, wt % ethylene 63, wt % ENB 4.2, Phr oil extension 75 | ExxonMobil Chemical Co |
| Vistalon ® VX1696 | ethylene-propylene-vinyl-norbornene, Mooney ML (1 + 4, 125° C.) 52, wt % ethylene 62, wt % VNB 0.75, Phr oil extension 100 | ExxonMobil Chemical Co |
| HRJ-14247A | phenolic resin diluted in oil | Schenectady Chemical |
| Stanchlor Anhydros ™ | stannous chloride catalyst | Mason Corp. |
| Kadox ® 911 | zinc oxide | Zinc Corp. of America |
| 2-5084 Silicon Hydride | silicon hydride (SiH) | Dow Corning |
| PC085 | platinum catalyst | United Chemical Technology Inc. |
| Icecap K ® | clay | Burgess Pigment Co. |
| Okerin 2709 Astor ® | Hydrocarbon wax | International Waxes Inc. |
| Sunpar ® 150M | paraffinic oil | R. E. Carol |
| Paralux ® 6001R | paraffinic oil | Chevron Texaco |

The abbreviations and test methods used in this disclosure are explained below:

"Hard" is the hardness of the TPV, measured in Sh A or Sh D units in accordance with ASTM D2240.

"M100" is the modulus of the material, and the M100 test indicates resistance to strain at 100% extension in force per unit area in accordance with ASTM D412 (ISO 37 type 2).

"UE %" is ultimate elongation, and indicates the distance a strand of the material can be stretched before it breaks in accordance with ASTM D412 (ISO 37 type 2).

"WtGn %" is a measurement of the amount of oil absorbed by the sample in an oil swell resistance test. Such a test is shown in U.S. Pat. No. 6,150,464. The test is based on ASTM D471 and ISO 1817, and requires a sample of TPV to be immersed in IRM 903 oil for 24 hours at 121° C. The weight gain percentage is a measure of the completeness of the cross-linking of the vulcanizate. Although weight gain values can vary depending on whether or not the elastomer is oil extended, and how much, in TPVs having the same composition, the values show the amount of cross-linking of the vulcanizates relative to each other.

"TnSet %" is the tension set, which is a measure of the permanent deformation of the TPV when it is stretched. A test specimen of dimensions 50.8 mm (2 in.) long, 2.54 mm (0.1 in.) wide and 2.03 mm (0.08 in.) thick, cut from an injection molded plaque is stretched to 100% and held for 10 minutes at 23° C. It is then allowed to relax at 23° C. for 10 minutes. The change in the length of the original specimen is measured and the TnSet % is calculated according to the formula:

$TnSet\ \% = ((L_1-L_0)/L_0) \times 100$, where $L_0$ is the original length and $L_1$ is the final length.

"Comset %" is the compression set, which is a measure of the permanent deformation of TPV when it is compressed. The test method is based on ISO 815:1991. A test specimen conforming to Type A requirements in ISO 815 with dimensions 29±0.5 mm diameter and 12.5±0.5 mm thickness are cut and stacked from and injection molded plaques, each of thickness 2.03 mm. The sample is compressed to 75% (for Sh A hardness <75) of its original height for 22 hrs at 70° C. The sample is then allowed to relax at 23° C. for about 30 minutes. The change in height of the original specimen is measured and the Comset % is calculated according to the formula:

Comset %=100×(Initial thickness−Final thickness)/ Initial thickness−spacer thickness minus thickness of shims and/or foils)

"ESR" is a measure of the surface smoothness of the TPV, where lower numbers indicate a more smooth surface. The ESR was measured using a Surfanalizer, supplied by Federal, in accordance with the manufacturer's instructions "UTS" is the ultimate tensile strength, and is given is force per unit area in accordance with ASTM D412 (ISO 37 type 2).

"LCR" is a measurement of viscosity in Pa-sec at 1200 $sec^{-1}$ shear rate using Lab Capillary Rheometer from Dynisco, per method described in ASTM D 3835.

"SpE" is the specific energy of the extrusion process in KW-Hr/Kg, and is a measure of the processing efficiency. SpE is measured by dividing the total motor power in KW, consumed by the extruder with the production rate in Kg/hr.

"Std. Dev." is the standard deviation, which is an estimate of the measure of how widely values ($X_n$) are dispersed from the average or mean value ($X_{ave}$). It includes variations from raw material supply sources, process sampling, test sample preparation, testing and operators and the like. It is calculated using the n−1 method, with n>21, as shown below:

$Std.Dev. = [((X_1-X_{ave})^2+(X_2-X_{ave})^2+(X_3-X_{ave})^2+\ldots (X_n-X_{ave})^2)/(n-1)]^{0.5}$.

"Ext %." is the weight % extractable measured after 48 hrs at room temperature in cyclohexane solvent. "Lower Ext." means higher state of cure or crosslink density in the elastomer. It is a measure of uncured weight % elastomer. Percent of crosslinked elastomer can be calculated by subtracting the extractable weight from 100.

The invention is further illustrated with reference to the following examples.

Examples 1-24

In these Examples, thresholds for the lower limits of thermoplastic polymer in a vulcanizate at different oil phr were explored in a twin screw extruder. The percentage of thermoplastic polymer content in processing was varied from 29.6 to 2.4 weight % on a total polymer basis, while oil content was varied from 82.4 phr (of which 7.4 phr was free oil added into twin screw extruder) to 282.4 phr (of which 207.4 phr was free oil added into twin screw extruder). The elastomer used in the processing was V3666, and the elastomer was cured using the phenolic resin curative at 10.5 phr (of which 7.4 phr was process oil), except for in examples 22 and 23. Example 22 used 5.27 phr of HRJ-14247A (of which 3.69 phr was process oil) and example 23 used 2.63 phr of HRJ-14247A (of which 1.84 phr was process oil). The Mooney viscosity ((1+4) at 125° C.) of the elastomer without oil extension is about 250, the average molecular weight is 170,000, the weight average molecular weight is >1,000,000, and the intrinsic viscosity is about 3.6 m$^3$/Kg.

A co-rotating, fully intermeshing type twin screw extruder, supplied by Coperion Corporation, Ramsey N.J., was used, following the method described in U.S. Pat. No. 4,594,391. The catalyst, thermoplastic, and cross-linkable thermoplastic elastomer were added in the feed throat. The phenolic resin curing agent, diluted in oil, was injected into the first 46% of the extruder, and additional process oil (plasticizer) was added before the cure addition, during the cure, and at one location after the substantial completion of cure. The total amount of oil, including the oil extension, plus oil added before and during cure was 60% or more. The extruded materials were fed into the extruder at a rate of 70 kg/hr. The extrusion mixing was carried out at 350 RPM. A barrel metal temperature profile in ° C., starting from barrel section 2 down towards the die to barrel section 12 of 160/160/160/160/160/150/150/150/150/150/150/200 (wherein the last value is for the die) was used. Low molecular contaminants, reaction by-products, residual moisture and the like were removed by venting through one or more vent ports, typically under vacuum, as needed.

The twin screw extruder type consisting of 3 screw tips with L/D about 44 was used in the sample preparation. A screw design with several mixing sections consisting of a combination of forward convey, neutral, and left handed kneading blocks, suitable to mix the process oil and provide sufficient residence time and shear for completing cure reaction were used. The mixing sections in the cure zone consisted of a preferred combination of kneading blocks of type forward, followed by neutral, followed by a left handed element. Such a combination of kneading blocks resulted in an improved surface appearance of an extruded profile. Each kneading block in the above mixing sections was at least an L/D of 0.25. The functions of screw kneading blocks are described in a publication from Coperion Corporation known as "Processing Lines", vol. 9(1) (January, 1999).

Table 2 shows examples 1-24 from a twin screw extruder of type 3 lobe for phenolic resin cure.

TABLE 2

| Ex # | Oil (phr) | PP (wt %) | PP (phr) | Oil:PP (phr:phr) | Hard (Sh A) | Comment |
|---|---|---|---|---|---|---|
| 1 | 182.4 | 16.7 | 20 | 9.1:1 | 37.7 | Good |
| 2 | 182.4 | 13.0 | 15 | 12.2:1 | 30.6 | Good |
| 3 | 182.4 | 9.1 | 10 | 18.2:1 | 23.6 | Poor |
| 4 | 182.4 | 4.8 | 5 | 36.5:1 | 16.4 | Poor |
| 5 | 182.4 | 2.4 | 2.5 | 73.0:1 | 13.8 | Poor |
| 6 | 222.4 | 16.7 | 20 | 11.1:1 | 32.1 | Good |
| 7 | 222.4 | 13.0 | 15 | 14.8:1 | 24.1 | Good |
| 8 | 222.4 | 9.1 | 10 | 22.2:1 | 16.3 | Good |
| 9 | 222.4 | 4.8 | 5 | 44.5:1 | 11.6 | Poor |

TABLE 2-continued

| Ex # | Oil (phr) | PP (wt %) | PP (phr) | Oil:PP (phr:phr) | Hard (Sh A) | Comment |
|---|---|---|---|---|---|---|
| 10 | 262.4 | 21.8 | 27.8 | 9.4:1 | 29.0 | Good |
| 11 | 262.4 | 16.7 | 20 | 13.1:1 | 17.5 | Good |
| 12 | 262.4 | 13.0 | 15 | 17.5:1 | 13.8 | Good |
| 13 | 262.4 | 9.1 | 10 | 26.2:1 | 10.5 | Good |
| 14 | 262.4 | 4.8 | 5 | 52.5:1 | 5.0 | Poor |
| 15 | 262.4 | 2.4 | 2.5 | 105.0:1 | 0.2 | Poor |
| 16 | 282.4 | 9.1 | 10 | 28.2:1 | 7.1 | Good |
| 17 | 282.4 | 4.8 | 5 | 56.5:1 | 0.2 | Good |
| 18 | 282.4 | 2.4 | 2.5 | 113.0:1 | 5.8 | Good |
| 19 | 132.4 | 24.7 | 32.8 | 4.1:1 | 57.3 | Good |
| 20 | 107.4 | 27.5 | 38 | 2.8:1 | 68.4 | Good |
| 21 | 82.4 | 29.6 | 42 | 2.0:1 | 73.9 | Good |
| 22 | 278.7 | 4.8 | 5 | 55.7:1 | 5.8 | Poor |
| 23 | 276.8 | 4.8 | 5 | 55.4:1 | 6.7 | V. Poor |
| 24 | 132.4 | 21.8 | 27.8 | 4.8:1 | NM | Poor |

In Table 2 and other tables, the comment "Good" indicates TPVs that were non-agglomerating, did not plug the 100 mesh filter screen installed toward the downstream end of the extruder, and provide resulting TPV compositions suitable for fabrication into parts that hold together (processable). "Poor" in this column in this and later tables indicates TPV sample that either plugged the 100 mesh screen and caused process shut downs due to high process pressures of >2300 psi or led to pellets that agglomerated, or had a rough or fluffy surface showing beginning signs of product that was ready to break-up into powdery particle form. "Very Poor" (V. Poor) means that there was very severe agglomeration. "NM" in this and later tables designates that no measurement was taken. Examples 2, 8, 13, 17-21 were at the transition points where a reduction in PP and, or oil level, outside the ratio within the relationship of the invention caused the thermoplastic vulcanizate to become Poor. In example 24 shown in this and later tables, no sample was collected due to rapid screen plugging, even though it contained a relatively high amount of PP (27.8 phr) (due to insufficient amount of total oil in the formulation). As can be seen, simply increasing the PP level from 27.8 phr to 32.8 phr at same 132.4 phr oil level a good TPV can be produced (see example 19).

In the graph of FIG. 1, a vulcanizate made using combined amounts of oil and thermoplastic polymer that lie above the curve was good TPV. It is a non-agglomerating, processable thermoplastic vulcanizate product. The open circles in the FIG. 1 correspond to examples listed in Table 1. The line drawn through those data illustrate the relationship for the threshold levels of total phr oil to wt % of PP for producing a good thermoplastic vulcanizate where the process oil is added before, during and after the addition of a curative agent, wherein the process oil is added in a ratio to engineering thermoplastic.

Table 3 below summarizes the properties for the thermoplastic vulcanizates from Table 2 with hardness >25 Sh A. The "comment" has the same meaning as for Table 2 and throughout. The results show thermoplastic vulcanizates in the Sh A hardness range 29 to 74 with useful mechanical and elastic properties. Ext %, the wt % of uncured elastomer based on total weight of the elastomer in the formulation, is at ≤0.81 wt %. The LCR viscosity for the examples in table 2 were in the range of 52-135 Pa-sec indicating good processability.

TABLE 3

| Ex # | Hard (Sh A) | UTS (psi/MPa) | M100 (psi/MPa) | UE % | Wt. Gn % | Ext %. | ESR | TnSet % | Comset % | Comment |
|---|---|---|---|---|---|---|---|---|---|---|
| 1 | 36.7 | 206/1.42 | 124/0.86 | 169 | 105 | 0.810 | 229 | 3.5 | 28 | Good |
| 2 | 30.6 | 218/1.50 | 107/0.74 | 206 | 104 | 0.755 | 243 | 7.5 | 27 | Good |
| 6 | 32.1 | 202/1.39 | 108/0.74 | 190 | 81 | 0.620 | 156 | 6.0 | 29 | Good |
| 10 | 29.0 | 178/1.21 | 112/0.77 | 174 | 66 | 0.575 | 85 | 7.5 | 33 | Good |
| 19 | 57.3 | 654/4.51 | 259/1.79 | 343 | 107 | 0.515 | 138 | 5.5 | NM | Good |
| 24 | 68.4 | 1066/7.35 | 386/2.66 | 452 | 100 | 0.530 | 99 | 9.0 | NM | Good |
| 21 | 73.9 | 1251/8.63 | 455/3.14 | 479 | 114 | 0.520 | 119 | 10 | NM | Good |
| 24 | NM | NM | NM | NM | NM | NM | NM | NM | NM | Poor |

Table 4 shows the effect of phenolic resin cure level in phr on the TPV composition properties. The PP wt % was 4.8 and oil phr was 282.4. For examples 22 and 23, the phenolic resin level was reduced by 50% and 75% compared to example 17, which contains 3.15 phr (all on a neat basis). The reference to phenolic resin cure level in phr in the description and claims is always on a neat basis (without the weight from oil dilution) unless otherwise noted.

The results, as shown in Table 4, show >2.45% extractables at less than or equal to 1.58 phr resin. The hardness measurements at this very low level of Shore A scale can easily be effected by porosity or very thin portion of (small skin) of thermoplastic crystalline PP, this sometimes gives an extremely low number such as 0.2 Sh A. The thermoplastic vulcanizate product pellets from the example 22 were judged as poor due to light agglomeration. The product pellets in example 23 showed a much greater tendency for agglomeration and are judged as poor (or, very poor) TPVs. The very soft examples in this table showed an LCR viscosity range of 38-44 Pa-sec, which is good for processability. The examples in this next table contain only a very low amount of thermoplastic (as low as 2.4 phr) and the end use may be limited to applications where elastic properties and not higher tensile strength is of primary interest. The letter "B" in this and later tables indicate that the sample broke during test and no measurement was available. "No" in this and other tables indicate that no measurement was possible.

The examples listed in Table 5 demonstrate properties for the thermoplastic vulcanizates listed in Table 2 with a maximum Sh A hardness of 25. The range of LCR viscosity for these examples was 29-142 Pa-sec.

TABLE 4

| Ex # | phenolic (phr) | Oil:PP (phr) | Hard (Sh A) | UTS (psi/MPa) | M100 (psi/MPa) | UE % | Wt. Gn % | Ext %. | ESR | Tn Set % | Com set % | Comment |
|---|---|---|---|---|---|---|---|---|---|---|---|---|
| 17 | 3.15 | 56.5:1 | 0.2 | 38/0.26 | 32/0.22 | 133 | 114 | 1.08 | 258 | B | 44 | Good |
| 22 | 1.58 | 55.7:1 | 6 | 47/0.32 | 26/0.18 | 242 | No | 2.47 | 402 | 12 | 58 | Poor |
| 23 | 0.79 | 55.4:1 | 7 | 57/0.39 | 19/0.13 | 463 | No | 6.43 | 409 | NM | 59 | V. Poor |

TABLE 5

| Ex # | Hard (Sh A) | UTS (psi/MPa) | M100 (psi/MPa) | UE % | Wt. Gn % | Ext %. | ESR | TnSet % | Comset % | Comment |
|---|---|---|---|---|---|---|---|---|---|---|
| 7 | 24.6 | 134/0.92 | 83/0.57 | 164 | 93 | 0.715 | 168 | 7.5 | 29 | Good |
| 8 | 16.3 | 82/0.57 | 59/0.41 | 158 | 134 | 0.910 | No | B | 32 | Good |
| 11 | 17.5 | 119/0.82 | 57/0.39 | 250 | 118 | 1.24 | 121 | 8.0 | 42 | Good |
| 12 | 13.8 | 107/0.74 | 62/0.43 | 170 | 98 | 0.7354 | 196 | 8.5 | 32 | Good |
| 13 | 10.5 | 68/0.47 | 49/0.34 | 150 | 134 | 0.970 | 322 | 8.0 | 31 | Good |
| 16 | 7.1 | 56/0.39 | 48/0.33 | 126 | 115 | 0.710 | No | B | 38 | Good |
| 18 | 5.8 | 39/0.27 | 34/0.23 | 136 | No Data | 1.24 | 410 | B | 41 | Good |
| 3 | 23.6 | 131/0.90 | 75/0.52 | 180 | 122 | 0.995 | 386 | 6.5 | NM | Poor |
| 4 | 16.4 | 107/0.74 | 53/0.37 | 191 | 179 | 0.435 | 564 | 6.5 | 30 | Poor |
| 5 | 13.8 | 91/0.63 | 44/0.30 | 204 | No | NM | 585 | 7.0 | NM | Poor |
| 9 | 11.6 | 72/0.50 | 42/0.29 | 175 | 177 | NM | 439 | B | NM | Poor |
| 14 | 5.0 | 39/0.27 | 39/0.27 | 125 | No | 0.945 | 400 | B | 35 | Poor |
| 15 | 0.2 | 36/0.25 | 32/0.22 | 126 | No | NM | 531 | B | NM | Poor |

Examples 25-26

Table 6 shows examples where the processing characteristics of the ring extruder of diameter 30 mm and L/D about 44 was used at a screw speed of 840 rpm for making soft compositions. The formulation for this invention example and comparative comprised the following (in phr): EPDM (V3666)=175 (of which 75 phr was extender oil), zinc oxide=2.0, stannous chloride=1.26, process oil=59.1, phenolic resin=8.4 (of which 5.88 phr was diluent oil), clay=42, and wax=3.27. The amounts of PP and process oil (see below Table 5). The PP used is a blend of 6 phr of F180A and the rest, F008F. Feed rate was maintained at 150 Kg/Hr, phenolic resin in oil was used as the curative, and the phenolic resin was injected into barrel in the first 25% of the length of extruder. During the mixing process, additional oil was added before and after the addition of the curative. The reactions were carried out so that the barrel temperature profile set points of each of the TPV compositions was the same. Barrel temperature settings for phenolic resin cure were feed barrel=cooling; barrel sections 2-6=180° C. (356° F.); barrel sections 7-11=170° C. (338° F.); barrel sections 12-14=160° C. (320° F.); Die=200° C. (392° F.). The curative was diluted in oil, and additional oil to make up to the total oil required under the invention formula was added in processing after the addition of the curative. About 10% of the oil was added before the addition of the curative. Processing oil, in this and the following examples, was used as a plasticizer. Low molecular contaminants, reaction by-products, residual moisture and the like were removed by venting in two locations, though more can be used as needed.

Because of the variability of the oil content used in the examples, the weight gain obtained by the absorption of oil does not give a meaningful indication of the completeness of the cross-linking of the elastomer. The data in Table 6 shows that the physical properties, tension set and UTS, are very good considering the softness of the TPVs. Physical properties declined as the amount of PP was reduced, but maintained acceptable levels. Examples 25 and 26 were included in the graph, the symbol "+" in FIG. 1.

TABLE 6

|  | Ex # | |
| --- | --- | --- |
|  | 25 | 26 |
| PP wt %(phr) | 11.5 (13) | 13.8 (16) |
| Total Oil(phr)[1] | 196.5 | 176.5 |
| Oil:PP (phr:phr) | 11.0:1 | 15.0:1 |
| Hard (Sh A) | 28.4 | 37 |
| ESR | 121 | 105 |
| UTS (psi/MPa) | 201/1.39 | 359/2.48 |
| M100 (psi/MPa) | 85/0.59 | 130/0.90 |
| UE % | 234 | 295 |
| TnSet % | 5 | 5 |
| SpE | 0.257 | 0.244 |
| Comment | Good | Good |

[1]Includes oil extension in elastomer and added oil in the mixing process

Example 27-29

Table 7 illustrates the invention by use of ring extruder with SiH cure system. In this table, properties of soft thermoplastic vulcanizates were studied varying the amounts of PP and oil used. Additional studies were done to measure the affect of the rpm's on properties. The feed rate was maintained at 150 Kg/Hr. A hydrosilation (SiH) cure was used, specifically 2-5084. The silicon hydride curative was added at L/D=8 starting from feed barrel, and platinum catalyst was added at L/D=14, in both cases start point is from feed barrel. The platinum catalyst was PC085 further diluted with oil prior to use. An amount of 0.66 wt % based on the total formula basis of SiH was used in experiments 27 and 28, and 0.83 wt % based on the total formula basis was used in experiment 29. The platinum catalyst, 0.0066-0.0082 phr, was used in the examples.

The elastomer used was VX1696, and the PP used was 51S07A from Equistar. The oil was Paralux® 6001R. The resulting formula for these invention examples comprised the following (in phr); PP=15-31, VX1696=200 (of which 100 phr was extender oil), zinc oxide=2.0, PC085=3.00-3.75 (0.011 wt % PC085 diluted in oil), process oil=138.5-178.5, silicon hydride=3.01-3.76, clay=42. Barrel temperature for the hydrosilation cure was the same as that of examples 25 and 26.

The Table 7 data shows the affect of varying oil and PP content while maintaining the extruder at 560 RPM. The product from Experiment 28 is illustrated in FIG. 2 to show the morphology. The results in Table 8 demonstrate that it is possible to produce thermoplastic vulcanizates of hardness <13 Sh A.

TABLE 7

|  | Ex # | | |
| --- | --- | --- | --- |
|  | 27 | 28 | 29 |
| PP wt % (phr) | 23.7 (31) | 18.7 (23) | 13.0 (15) |
| Total Oil(phr)[1] | 241.5 | 261.5 | 282.3 |
| Oil:PP (phr:phr) | 7.8:1 | 11.4:1 | 18.8:1 |
| ESR | 631 | 503 | NA |
| Hard (Sh A) | 32.8 | 27.1 | 12.9 |
| UTS (psi/MPa) | 251/1.73 | 195/1.34 | 150/1.03 |
| M100 (psi/MPa) | 116/0.80 | 91/0.63 | 67/0.46 |
| TnSet % | 7.5 | 7.5 | 10 |
| UE % | 253 | 276 | 225 |
| SpE | 0.193 | 0.186 | 0.175 |
| Wt. Gn. % | 114 | 139 | 122 |
| Comment | Good | Good | Good |

[1]Includes oil extension in elastomer and added oil in the mixing process

Table 8 shows the effect of ring extruder RPM in making the softest thermoplastic vulcanizate identified in Table 7. The properties of examples 29, 30, and 31 in Table 8 were determined for thermoplastic vulcanizates made at 380, 560 and 840 RPM, respectively.

TABLE 8

|  | Ex # | | |
| --- | --- | --- | --- |
|  | 29 | 30 | 31 |
| Screw Speed (RPM) | 560 | 380 | 840 |
| Free Oil (wt %) | 40.1 | 40.1 | 40.1 |
| Total Oil (wt %) | 62.6 | 62.6 | 62.6 |
| Wt. Gn % | 122 | 121 | 172 |
| Hard (Sh A) | 12.9 | 14.2 | 12.4 |
| UTS (psi/MPa) | 150/1.03 | 147/1.01 | 149/1.03 |
| M100 (psi/MPa) | 67/0.46 | 68/0.48 | 61/0.42 |
| UE % | 225 | 205 | 254 |
| TnSet % | 10 | 7.5 | 10 |
| SpE | 0.175 | 0.128 | 0.215 |
| Comment | Good | Good | Good |

The data indicates better properties at lower RPM, with a significant decline in oil swelling properties, decline in elongation properties and increase in M100 for the TPV compared to those mixed at 840 RPM.

Examples 32-34

Tables 9a and 9b show results from using a co-rotating twin screw, MEGA compounder supplied by Coperion Co. In this example a phenolic resin curative was used at 6.3 phr (of which 4.41 is process oil and 1.89 is cure agent), the elastomer V3666 was used in the amount of 175 parts (of which 75 phr was oil extension), the oil and polypropylene (PP) blend (50% of PP5341 and 50% of FP180A) amounts are indicated in Table 8 (a). A barrel temperature profile of 180° C. for barrels 2 through 8, 170° C. for barrels 7 through 10, 180° C. for barrels 11 through 15, and 200° C. for die. The mass flow rate was 426 kg/hr and the RPM was 900. Oil at 53% to 60% by weight based on total oil in the formulation was added in three locations (which included diluent oil with cure) before and during cure. The cure was added at the middle of barrel section number 5 from the feed throat. In example 34, the mass flow rate was maintained at 417 kg/hr. The formulation and other conditions for the experiment were same as described for examples 32 and 33. One or more vent ports with vacuum capability was used to remove any volatiles, reaction by-products, or moisture. These examples illustrated that TPV products at hardness ≤25 Sh A can be produced using a MEGA Compounder. In FIG. 1, the triangle symbols ("Δ") represent examples 32-34.

TABLE 9a

| Ex # | PP (wt %) | PP (Phr) | Oil (Phr) | Oil:PP (Phr) | Hard (Sh A) |
|---|---|---|---|---|---|
| 32 | 16.7 | 20.0 | 175 | 8.8:1 | 37 |
| 33 | 16.7 | 20.0 | 195 | 9.75:1 | 34 |
| 34 | 11.5 | 13.0 | 195 | 15:1 | 24.7 |

TABLE 9b

| Ex # | UTS (psi/MPa) | M100 (psi/MPa) | UE % | Wt. Gn % | Ext %. | TnSet % | Comment |
|---|---|---|---|---|---|---|---|
| 32 | 349/2.41 | 115/0.79 | 327 | 107 | NM | NM | Good |
| 33 | 301/2.08 | 101/0.70 | 338 | 102 | NM | NM | Good |
| 34 | 186/1.28 | 75/0.52 | 250 | 151 | NM | NM | Good |

Examples 19-21, C1-C3

Examples in Table 9 (19, 20, and 21) showed that the elastomer content for the invention are high some other formulations (C1-C3). This higher elastomer content for the invention compositions can be beneficial for use in applications for improved elastic performance.

TABLE 9

| Ex # | EPDM[1] (wt %) | Oil (phr) | PP (phr) | Hard (Sh A) |
|---|---|---|---|---|
| 19 | 75.3 | 132.4 | 32.8 | 57.3 |
| 20 | 72.5 | 107.4 | 38.0 | 68.4 |
| 21 | 70.4 | 82.4 | 42.0 | 73.9 |
| C1 | 74.6 | 140.0 | 34.0 | 59.5 |
| C2 | 67.6 | 137.2 | 48.0 | 68.7 |
| C3 | 60.2 | 131.7 | 66.0 | 78.8 |

[1]EPDM weight % on a total polymer weight basis.

Thus, another aspect of the invention is to a thermoplastic vulcanizate composition comprising from 1 or 3 or 6 wt % to 6 or 8 or 10 or 16 or 18 wt % thermoplastic polymer, based upon the total polymer, and a fully crosslinked elastomer exhibiting a level of extractables in room temperature cyclohexane not greater that 6 wt %, the composition having a durometer less of than 25 Shore A. Yet another aspect of the invention is to the use of such a thermoplastic vulcanizate composition.

Aspects of the invention can thus be described by the following enumerated embodiments:
1. A process for preparing a thermoplastic vulcanizate composition comprising melt blending from 1 to 18 wt % thermoplastic polymer, based upon the total polymer, an elastomer, a curative and a process oil such that the weight ratio of process oil to thermoplastic polymer ranges from 200:1 to 4:1; and isolating a thermoplastic vulcanizate composition exhibiting a level of extractables in room temperature cyclohexane not greater that 6 wt %, the composition having a durometer of less than 25 Shore A.
2. A process for preparing a thermoplastic vulcanizate composition comprising:
   i) melt blending a thermoplastic polymer with a cross-linkable elastomer under conditions of dynamic vulcanization;
   ii) adding before, at or after the start of the melt blending in step i) at least one curative agent for the elastomer so as to cross-link the elastomer during the melt blending;
   iii) introducing process oil into the melt blending of a) before, during, after, or intermittently with the addition of the curative agent, wherein the process oil is added in a ratio to the thermoplastic polymer established by the equation:

$(-5.9T_P+365) \geq O_L \geq (-8.9T_P+243)$, where $O_L$ represents the total process oil level in phr, $T_P$ represents the weight percent, on a total polymer basis, of the thermoplastic polymer and ranges from 1 to 60 wt %; and,
   iv) extruding a thermoplastic vulcanizate blend of thermoplastic polymer and cross-linked elastomer that upon subsequent cooling has a level of extractables in room temperature cyclohexane of less than 6 wt % of the total weight of elastomer.
3. The process of embodiments 1 or 2, wherein the curative agent is added in amount equal to from 1.6 to 10.0 parts per hundred parts rubber.
4. The process of embodiments 1 or 2, wherein the curative agent is added in an amount from 3.0 to 8.0 parts per hundred parts rubber.
5. The process of any of the preceding embodiments, wherein the thermoplastic polymer is present in an amount greater than 1 wt % but less than 18 wt % based upon the total weight of thermoplastic polymer plus elastomer.
6. The process of embodiments 5, wherein the thermoplastic polymer is present in an amount greater than 2.0 wt % but less than 6 wt % based upon the total weight of thermoplastic polymer plus elastomer.
7. The process of embodiment 2 wherein the thermoplastic polymer is or contains a compatibilizer or compatiblizer forming thermoplastic, and wherein the process further comprises:
   v) pelletizing the thermoplastic vulcanizate of step iv); and
   vi) melt processing the pellets formed in v) with one or more additional thermoplastic polymers.
8. The process of embodiment 2, wherein the thermoplastic polymer is or contains a compatibilizer or compatiblizer forming thermoplastic, and wherein the process further comprises:
   v) introducing after cure into the processing one or more additional thermoplastic polymer that may be the same or different than the original thermoplastic polymer.
9. The process of embodiment 2, wherein more than one melt processor is used in melt processing.
10. The process of embodiment 1 or 2, wherein the process oil is added to establish a ratio of oil to thermoplastic polymer of from 150:1 to 5:1.
11. The process of embodiment 1 or 2, wherein the process oil is added to establish a ratio of oil to thermoplastic polymer of from 140:1 to 30:1.

12. The process of embodiment 1 or 2, wherein the thermoplastic polymer is one or more isotactic homopolymers derived from propylene.

13. The process of embodiment 12, wherein the thermoplastic polymer is selected from propylene homopolymers or copolymers, and the cross-linkable elastomer is a non-polar elastomer.

14. The process of embodiment 13, wherein the cross-linkable elastomer is selected from mono-olefin copolymer elastomers, EPDM, butyl rubber, styrene-butadiene elastomer, natural rubber, and butadiene elastomer.

Another aspect of the invention is to the use of a thermoplastic vulcanizate composition in forming pellets or an article of manufacture, the thermoplastic vulcanizate comprising from 1 to 18 wt % thermoplastic polymer, based upon the total polymer, and a fully crosslinked elastomer exhibiting a level of extractables in room temperature cyclohexane not greater that 6 wt %, the composition having a durometer less of than 50 or 40 or 30 or 25 Shore A.

We claim:

1. A process for preparing a thermoplastic vulcanizate composition comprising:
   melt-blending from 1 to 18 wt % thermoplastic polymer, based upon the total polymer, a cross-linkable elastomer, at least one curing agent, and a process oil such that the weight ratio of process oil to thermoplastic polymer ranges from 200:1 to 4:1; and
   isolating a thermoplastic vulcanizate composition exhibiting a level of extractables in room temperature cyclohexane not greater that 6 wt %, the composition having a durometer of less than 25 Shore A;
   wherein the cross-linkable elastomer is one or more of mono-olefin copolymer elastomers, EPDM or butyl rubber,
   wherein the thermoplastic polymer is one or more of propylene homopolymers or copolymers having a melt temperature due to isotactic arrangement of propylene derived monomers, as measured by DSC, from 50° C. to 175° C. a density of 0.90 to 0.91 g/cm$^3$ and a melt flow rate from 0.3 dg/min to 50 dg/min; and
   wherein the thermoplastic vulcanizate composition consists of the reaction product of the thermoplastic polymer, the cross-linkable elastomer, the curing agent, and the process oil.

2. A process for preparing a thermoplastic vulcanizate composition comprising:
   i) melt blending a thermoplastic polymer with a cross-linkable elastomer under conditions of dynamic vulcanization;
   ii) adding before, at or after the start of the melt blending in step i) at least one curing agent for the elastomer so as to cross-link the elastomer during the melt blending;
   iii) introducing process oil into the melt blending of i) before, during, and/or after, the addition of the curative agent, wherein the process oil is added in a ratio to the thermoplastic polymer established by the equation:

$(-5.9Tp+365 \geq O_L \geq (-8.9Tp+243))$, where $O_L$ represents the total process oil level in phr, Tp represents the weight percent, on a total polymer basis, of the thermoplastic polymer and ranges from 1 to 18 wt %; and,
   iv) extruding a thermoplastic vulcanizate blend of thermoplastic polymer and cross-linked elastomer that upon subsequent cooling has a level of extractables in room temperature cyclohexane of less than 6 wt % of the total weight of elastomer;
   wherein the thermoplastic polymer is one or more of propylene homopolymers or copolymers having a melt temperature due to isotactic arrangement of propylene derived monomers, as measured by DSC, from 50° C. to 175° C., a density of 0.90 to 0.91 g/cm$^3$ and a melt flow rate from 0.3 dg/min to 50 dg/min and wherein the thermoplastic vulcanizate composition has a durometer less of than 25 Shore A; and wherein the weight ratio of process oil to thermoplastic polymer ranges from 200:1 to 4:1; and wherein the thermoplastic vulcanizate composition consists of the reaction product of the thermoplastic polymer, the cross-linkable elastomer, the curing agent, and the process oil.

3. The process of claims 1 or 2, wherein the curative agent is added in amount equal to from 1.6 to 10.0 parts per hundred parts rubber.

4. The process of claim 1 or 2, wherein the curative agent is added in an amount from 3.0 to 8.0 parts per hundred parts rubber.

5. The process of claim 2, wherein the thermoplastic polymer is present in an amount greater than 1 wt % but less than 12 wt % based upon the total weight of thermoplastic polymer plus elastomer.

6. The process of claim 5, wherein the thermoplastic polymer is present in an amount greater than 2.0 wt % but less than 6 wt % based upon the total weight of thermoplastic polymer plus elastomer.

7. The process of claim 2, wherein the thermoplastic polymer is or contains a compatibilizer or compatiblizer forming thermoplastic, and wherein the process further comprises:
   v) pelletizing the thermoplastic vulcanizate of step iv); and
   vi) melt processing the pellets formed in v) with one or more additional thermoplastic polymers.

8. The process of claim 2, wherein the thermoplastic polymer is or contains a compatibilizer or compatiblizer forming thermoplastic, and wherein the process further comprises:
   v) introducing after cure into the processing one or more additional thermoplastic polymer that may be the same or different than the original thermoplastic polymer.

9. The process of claims 1 or 2, wherein more than one melt processors is used in melt processing.

10. The process of claims 1 or 2, wherein the process oil is added to establish a ratio of oil to thermoplastic polymer of from 150:1 to 5:1.

11. The process of claims 1 or 2, wherein the process oil is added to establish a ratio of oil to thermoplastic polymer of from 140:1 to 30:1.

12. The process of claim 2, wherein the cross-linkable elastomer consists essentially of one or more of mono-olefin copolymer, EPDM or butyl rubber.

13. The thermoplastic vulcanizate composition that consists of from 1 to 18 wt % thermoplastic polymer, based upon the total polymer, a fully cross-linked elastomer exhibiting a level of extractables in room temperature cyclohexane not greater that 6 wt %, and an oil, where the composition has a durometer less of than 50 Shore A, and where the cross-linked elastomer including one or more of mono-olefin copolymer elastomers, EPDM or butyl rubber, wherein the thermoplastic polymer is one or more of propylene homopolymers or copolymers having a melt temperature due to isotactic arrangement of propylene derived monomers, as measured by DSC, from 50° C. to 175° C., a density of 0.90 to 0.91 g/cm$^3$, and a melt flow rate from 0.3 dg/min to 50 dg/min, and wherein the weight ratio of process oil to thermoplastic polymer ranges from 200:1 to 4:1.

14. The thermoplastic vulcanizate composition of claim 13, wherein the fully cross-linked elastomer exhibits a level of extractables in room temperature cyclohexane not greater that 2 wt %.

15. The thermoplastic vulcanizate composition of claim 13, wherein the thermoplastic polymer is one or more propylene homopolymers.

16. The thermoplastic vulcanizate composition of claim 13, wherein the elastomer is an EPDM.

17. The thermoplastic vulcanizate composition of claim 13, wherein the thermoplastic vulcanizate consists of from 1 wt % to less than 6 wt % thermoplastic polymer.

18. The thermoplastic vulcanizate composition of claim 13, wherein the ratio of oil to thermoplastic polymer is from 150:1 to 5:1.

19. The thermoplastic vulcanizate composition of claim 13, wherein the ratio of oil to thermoplastic polymer is from 140:1 to 30:1.

20. The thermoplastic vulcanizate composition of claim 13, wherein the thermoplastic vulcanizate composition has a durometer less of than 25 Shore A.

21. The process of claim 1, wherein the process oil is added to establish a ratio of oil to thermoplastic polymer of from 200:1 to 10:1.

22. The process of claim 1, wherein the process oil is added to establish a ratio of oil to thermoplastic polymer of from 200:1 to 8:1.

23. The process of claim 1, wherein the thermoplastic polymer is present in an amount greater than 1% but less than 12 wt % based upon the total weight of thermoplastic polymer plus elastomer.

24. The process of claim 1, wherein the thermoplastic polymer is present in an amount greater than 1% but less than 10 wt % based upon the total weight of thermoplastic polymer plus elastomer.

25. The process of claim 1, wherein the thermoplastic polymer is present in an amount greater than 1% but less than 8 wt % based upon the total weight of thermoplastic polymer plus elastomer.

* * * * *